(12) United States Patent
Webster

(10) Patent No.: US 12,004,922 B1
(45) Date of Patent: Jun. 11, 2024

(54) DOG TOOTHBRUSH WITH ATTACHED TREAT

(71) Applicant: Joshua Marc Webster, Dane, WI (US)

(72) Inventor: Joshua Marc Webster, Dane, WI (US)

(*) Notice: Subject to any disclaimer, the term of this patent is extended or adjusted under 35 U.S.C. 154(b) by 0 days.

(21) Appl. No.: 18/411,995

(22) Filed: Jan. 12, 2024

Related U.S. Application Data

(60) Provisional application No. 63/461,788, filed on Apr. 25, 2023.

(51) Int. Cl.
| | | |
|---|---|---|
| *A61D 5/00* | (2006.01) | |
| *A01K 15/02* | (2006.01) | |
| *A46B 5/00* | (2006.01) | |
| *A46B 9/02* | (2006.01) | |
| *A46B 15/00* | (2006.01) | |

(52) U.S. Cl.
CPC .............. *A61D 5/00* (2013.01); *A01K 15/026* (2013.01); *A46B 5/0095* (2013.01); *A46B 9/025* (2013.01); *A46B 9/026* (2013.01); *A46B 15/0055* (2013.01); *A46B 2200/1086* (2013.01)

(58) Field of Classification Search
CPC .................... A61D 5/00; A01K 15/026; A46B 2200/1093; A46B 5/02; A46B 2200/1086
See application file for complete search history.

(56) References Cited

U.S. PATENT DOCUMENTS

| | | | |
|---|---|---|---|
| 5,944,516 A * | 8/1999 | Deshaies | ................. A61D 5/00 15/167.1 |
| 6,050,224 A | 4/2000 | Owens | |
| 6,546,896 B1 | 4/2003 | Markham | |
| 7,032,541 B1 | 4/2006 | Tsengas | |
| 7,506,614 B1 * | 3/2009 | Tsengas | ............... A01K 15/026 119/710 |
| 7,810,455 B2 * | 10/2010 | Axelrod | ............... A01K 15/026 119/709 |
| 9,370,168 B2 | 6/2016 | Dewey et al. | |
| 9,770,010 B2 | 9/2017 | Wechsler | |
| 9,788,526 B2 * | 10/2017 | Mann | .................... A01K 15/026 |
| 10,575,498 B2 | 3/2020 | Roetheli et al. | |
| 2007/0015100 A1 * | 1/2007 | Morris | ................. A01K 15/026 433/1 |

(Continued)

OTHER PUBLICATIONS

Brushbone, https://www.bulbhead.com/products/brushbone, downloaded Dec. 11, 2023.

(Continued)

*Primary Examiner* — Ralph A Lewis
(74) *Attorney, Agent, or Firm* — Stiennon & Stiennon

(57) ABSTRACT

A dog toothbrush assembly has two plastic end caps with blind cavities that face one another and receive an elongated generally cylindrical chew element which is attractive to dogs such as an edible treat or other chewable material. The end caps are connected by screw fasteners to the support member of a brush, and an array of tufts of bristles project upwardly from the support member to engage the elongated chew element. The chew element is supported with respect to the bristles such that when a dog chews on the chew element the dog's teeth also encounter and are brushed by the bristles. When the chew element is worn or consumed, an end cap is removed by releasing one of the screw fasteners, thereby giving access for insertion of a replacement chew element.

20 Claims, 3 Drawing Sheets

(56) References Cited

U.S. PATENT DOCUMENTS

| | | | |
|---|---|---|---|
| 2008/0314333 A1 | 12/2008 | Hurwitz | |
| 2009/0095231 A1* | 4/2009 | Axelrod | A01K 15/026 |
| | | | 119/709 |
| 2011/0011351 A1* | 1/2011 | Simoni | A01K 15/026 |
| | | | 119/709 |
| 2012/0204809 A1* | 8/2012 | Axelrod | A01K 15/026 |
| | | | 119/709 |
| 2015/0090193 A1* | 4/2015 | Giarrizzo | A61D 5/00 |
| | | | 119/709 |
| 2018/0243063 A1* | 8/2018 | Coopersmith | A61D 7/00 |
| 2021/0289749 A1* | 9/2021 | Lai | A01K 15/026 |
| 2022/0272945 A1* | 9/2022 | Jackson | A01K 15/026 |

OTHER PUBLICATIONS

PetSafe® Busy Buddy® Bristle Bone® device, https://wwwpetsafe.com/product/busy-buddy-bristle-bone/?sku=BB-BRI-BN-XS, downloaded Dec. 11, 2023.

\* cited by examiner

DOG TOOTHBRUSH WITH ATTACHED TREAT

CROSS REFERENCES TO RELATED APPLICATIONS

This application claims the benefit of priority of U.S. provisional App. No. 63/461,788 filed Apr. 25, 2023, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to devices for caring for a dog's teeth. As in humans, the health of a dog's teeth and gums, has a significant effect on the animal's overall health. Professional veterinarian care of a dog's teeth is costly. Moreover, it generally requires anesthetizing the dog with its attendant costs and risks. Prior to a veterinarian cleaning a dog's teeth there is generally an initial consultation and a precleaning oral exam which may require dental X-rays. Anesthetizing a dog often requires tests to make sure that the dog is healthy enough to undergo anesthesia, and there is the possibility of some complications due to the anesthesia, which can significantly increase costs.

Regular dental teeth care for a dog throughout the year is recommended and can decrease the frequency of veterinarian visits for teeth cleaning. Regular care of a dog's teeth can involve feeding the dog dry food and offering chews with ridges and nubs which help clean the dog's teeth and reduce plaque and tartar buildup. Beyond dry food and chews, regular brushing of a dog's teeth with a toothbrush at least twice a day is desirable, although brushing three times a week may be considered sufficient. As pets do not pursue dental hygiene, it is incumbent on the pet's owner to schedule and carry out the regular brushing.

What is needed is a device which supplements or replaces the necessity of brushing a dog's teeth in a manner that is mainly carried out by the dog itself. Various devices are known which seclude a dog-attracting treat or element on the device interior, the device having gum-massaging or brushing elements which engage within the dog's mouth as it pursues the secluded treat. What is needed is a device that allows the dog to self-treat to address dental hygiene while more prominently presenting the dog-attracting treat or element.

SUMMARY OF THE INVENTION

A dog toothbrush assembly supports an elongated chew element which is attractive to dogs such as an edible treat or other chewable material in a highly exposed manner to be readily perceptible by a dog and readily chewed upon with minimal restrictions to its access. The device has two plastic end caps with blind cavities that face one another and receive the stiff chew element therebetween. The end caps are connected by screw fasteners to the support member of a brush, and an array of tufts of bristles project upwardly from the support member to engage the elongated chew element. The chew element is supported with respect to the bristles such that when a dog chews on the chew element the dog's teeth also encounter and are brushed by the bristles. The spacing between the cylindrical brush and the cylindrical chew element is selected so that the natural tendency of the dog to grip the chew between its back molars draws the attached brush into engagement with the dog's teeth. The chewing motion which moves the brush in and out of the dog's mouth results in the brush bristles engaging with the dog's teeth and gums. When the chew element is worn or consumed, an end cap is removed by releasing one of the screw fasteners, thereby giving access for insertion of a replacement chew element.

It is an object of the present invention to provide a dog toothbrush which is operable by a dog acting on its own.

It is a further object of the present invention to provide a dog toothbrush which is attractive to a dog by presenting a chew element which is largely unobscured.

It is another object of the present invention to provide a dog toothbrush which readily permits replacement of the attractive chew element.

Further objects, features and advantages of the invention will be apparent from the following detailed description when taken in conjunction with the accompanying drawings.

DESCRIPTION OF THE PREFERRED EMBODIMENTS

Figure 1:
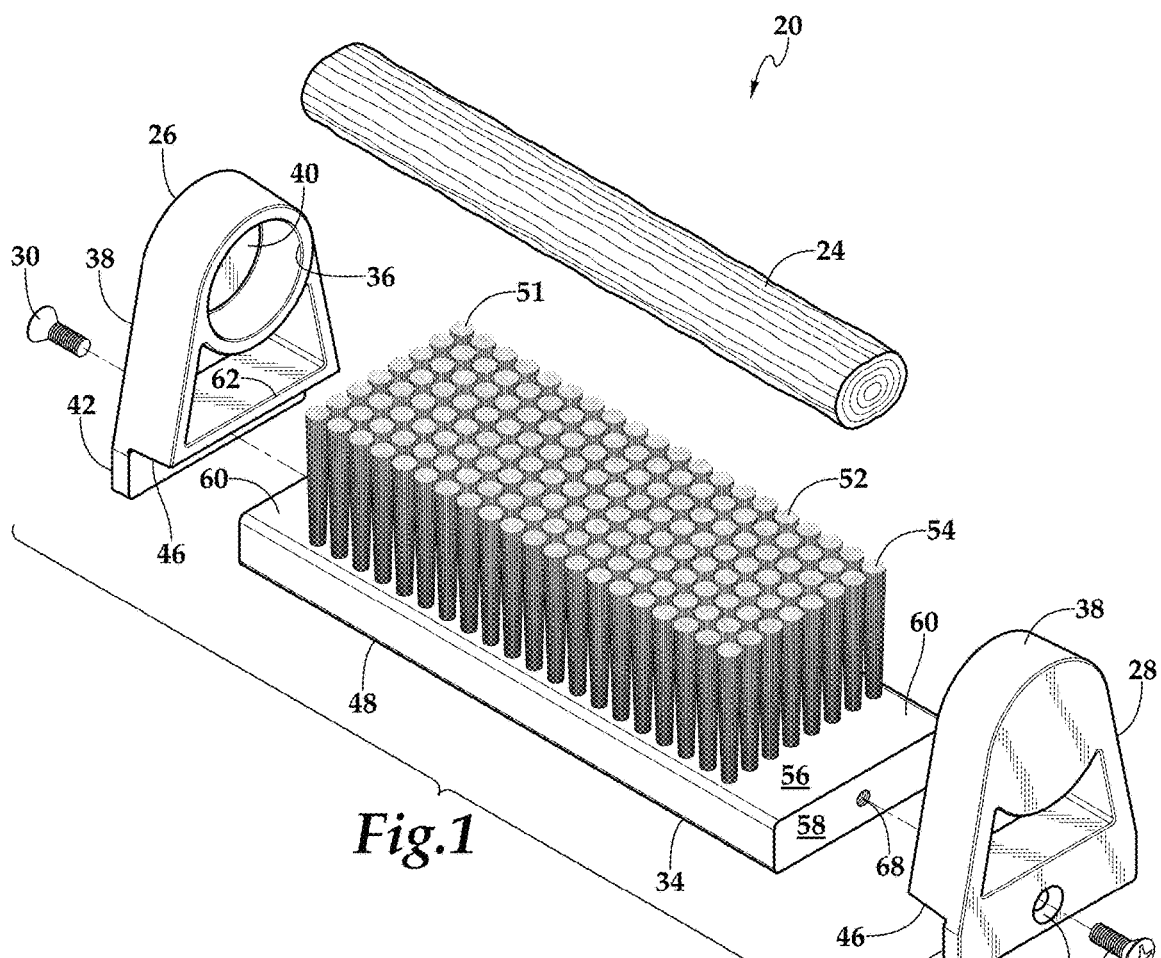
FIG. 1 is an exploded isometric view of dog toothbrush with an associated treat.
Figure 2:
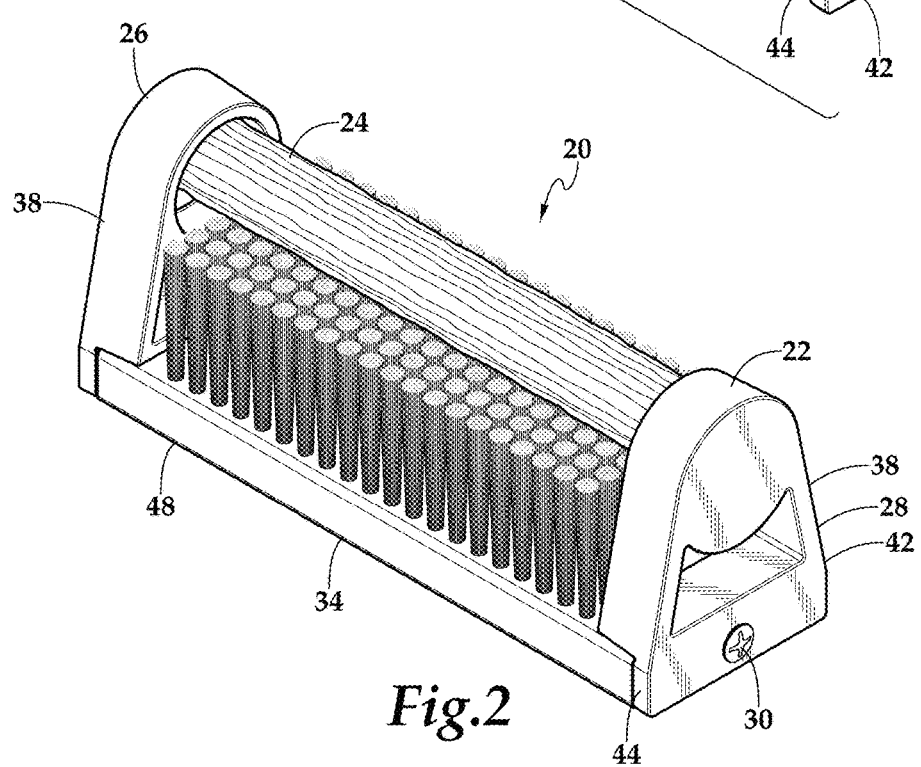
FIG. 2 is an isometric view of the dog toothbrush with treat of FIG. 1.
Figure 3:
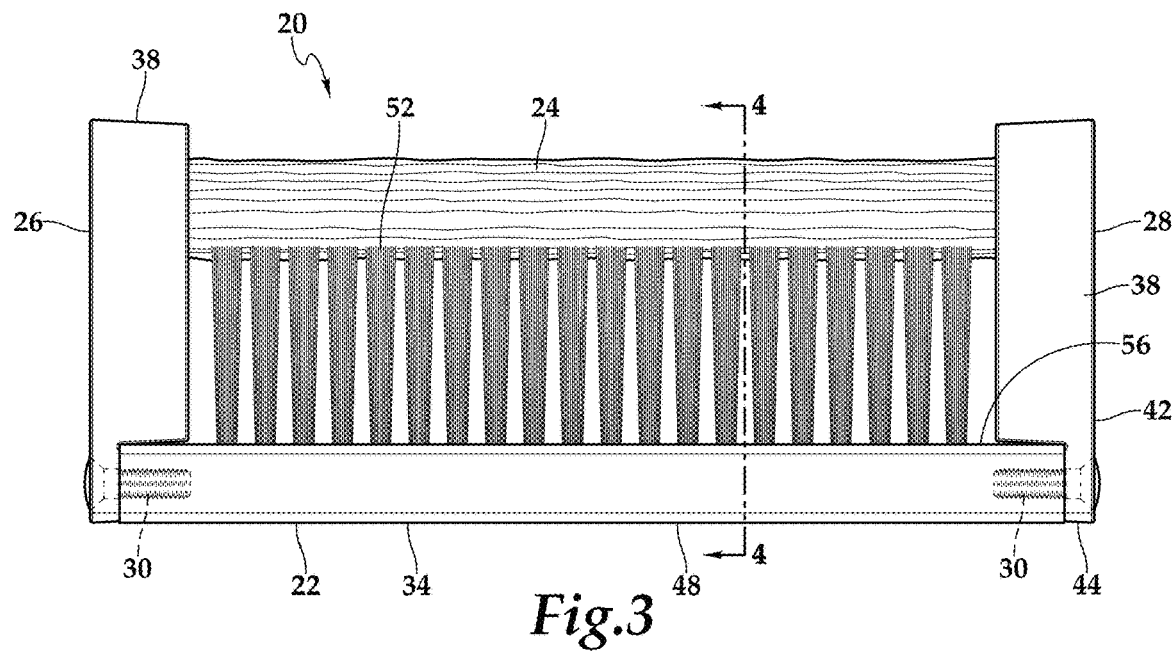
FIG. 3 a side elevational view of the dog toothbrush with attached treat of FIG. 2.

Referring more particularly to FIGS. 1-7, wherein like numbers refer to similar parts, a dog tooth brushing assembly 20 is shown in FIG. 2 having a dog toothbrush 22 which supports an elongated dog treat element 24. As shown in FIG. 1, the dog toothbrush 22 has two end caps 26, 28 which are connected by fasteners such as screws 30 to a brush assembly.

The end caps 26, 28 may be formed of plastic such as high-density polyethylene (HDPE). Each end cap 26, 28 has a blind cylindrical chew cavity 36 recessed within an upper portion 38. Each chew cavity 36 is terminated by an end wall 40 formed by the upper portion 38. Each end cap 26, 28 has a mounting wall 42 positioned below the upper portion 38, which may be configured as a vertical flange 44 which extends downwardly from the upper portion. Each end cap 26, 28 upper portion 38 has a downwardly facing generally horizontal wall 62 which defines a recess 46 positioned below the upper portion horizontal wall and extending along the mounting wall 42 adjacent the flange 44.

The brush assembly 34 has a plastic brush support member 48 which may be a generally rectangular block with a regular pattern of holes 50 which each receive a tuft 52 comprised of multiple flexible plastic bristles 54 which together define an array 51 of bristles which protrude from the support member and extend upwardly towards the elongated chew element 24 when it is engaged between the chew cavities 36. The brush support member 48 has a horizontal upper surface 56 which extends between two generally vertical end surfaces 58. The upper surface 56 extends on each side of the brush array 51 over mounting segments 60 of the brush member which are free of bristles. Each mounting segment 60 is received within a recess 46 of the first end cap 26 and the second end cap 28, with the upper surfaces 56 facing the horizontal walls 62 of the end caps. The brush support member 48 end surfaces thus extend substantially parallel to the end cap flanges. The engagement of the brush support member mounting segments 60 within the recesses 46 provides that rotation of the end caps with respect to the brush support member is restricted by engagement of the upper surfaces 56 with the end cap upper portion horizontal walls 62 within the recesses.

The brush assembly 34 brush support member 48 is fastened between the first end cap 26 and the second end cap 28 by fasteners such as the screws 30. Each screw 30 extends through a non-threaded hole 64 passing through an end cap flange 44 and into a threaded pilot hole 68 in the brush support member 48 which opens on the end surface 58. When assembled, the bristles 54 extend upwardly.

Each fastener 30 is releasable to permit an end cap to be selectively removed from the brush support member. The elongated chew element 24 is a generally cylindrical member which is attractive to dogs, for example an edible treat such as a bully stick or a collagen stick, or a raw hide stick, or even a frozen ice element. The elongated chew element may be about six inches in length from end to end, and less than about one inch in diameter. Bully sticks are made from beef muscle and are digestible by dogs. By releasing one or both of the screw fasteners 30, the end caps 26, 28 may be removed such that an elongated chew element 24 of the appropriate length may be inserted into the opposed chew cavities of the facing end caps. Once the elongated chew element 24 is in place, the screws 30 are tightened to secure the chew element in place with respect to the bristles. In this position, the chew element is restricted in its axial travel by the end walls of the chew cavities. Generally, it is only necessary to remove a single end cap in order to insert a chew element.

Figure 4:
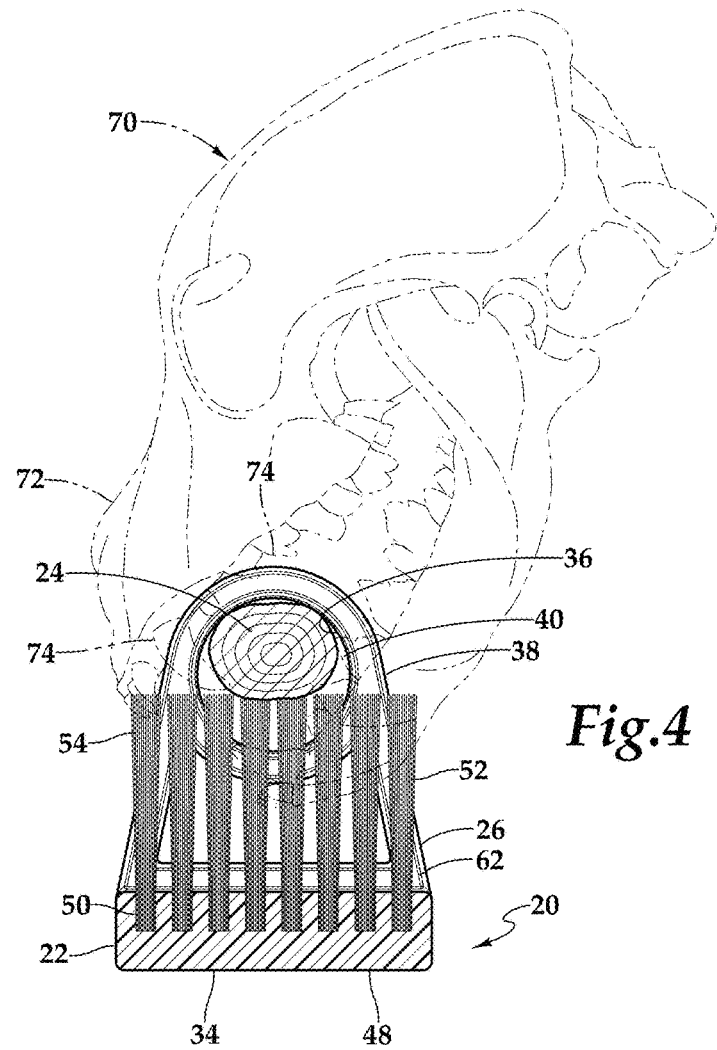
FIG. 4 is a cross-sectional view of the dog toothbrush with attached treat of FIG. 3 taken along section line 4-4 shown in relationship to a skeletal view of a dog utilizing the device in broken lines.

As shown in FIG. 4, the chew cavities 36 extend downwardly to a height above the brush support member which is below the height which the undistorted bristles 54 extend above the upper surface of the brush support member. The elongated chew member 24 is preferably selected to be large enough in diameter so that when it is engaged between the chew cavity the upper surface of the chew member engages against the upper perimeter of the chew cavities and is urged downwardly into engagement with the bristles. Smaller diameter chew elements will remain functional, but will be free to move vertically a certain amount. As engaged within the dog tooth brush 22, the chew element is presented largely unobstructed to the mouth of the dog 70. When the dog exercises its jaws 72 to gnaw on the chew element 24, the bristles 54 of the brush assembly 34 will inevitably encounter the dog's teeth 74, and, as the dog chews on the durable treat, the dog's teeth will be brushed. This brushing is carried out entirely under the dog's control without requiring the intervention of the pet owner. The brushing takes place as an accessory to the dog's natural desire to encounter and chew upon an edible element. The owner can control the appropriate duration of brushing by removing the device from the dog at a desired time.

When an elongated chew element 24 has been consumed or broken, it will separate from the brush. A new element may then be inserted by using a screwdriver to remove a fastener 30 to separate one of the end caps from the brush assembly 34, inserting the new chew element 24, and then replacing and securing the end cap.

Figure 5:
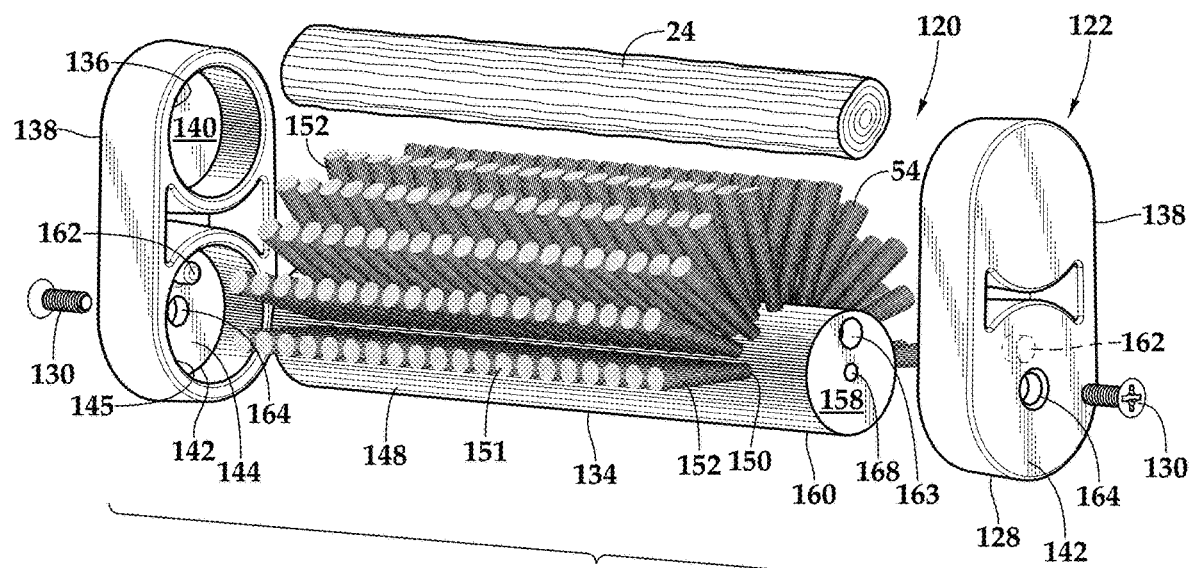
FIG. 5 is an exploded view of an alternative embodiment dog toothbrush of this invention shown in relation to an elongated treat.
Figure 6:
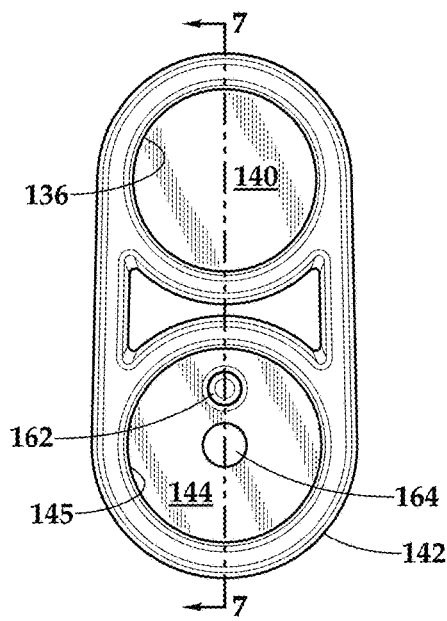
FIG. 6 is an elevational view of an end cap of the device of FIG. 5.
Figure 7:
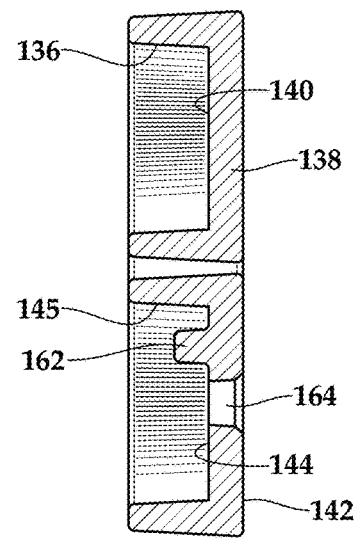
FIG. 7 is a cross-sectional view of the end cap of FIG. 6 taken along section line 7-7.

An alternative embodiment dog tooth brushing assembly 120 is shown in FIGS. 5-7 having a dog toothbrush 122 with radially extending bristles which supports the elongated dog chew element 24. The dog toothbrush 22 has two plastic end caps 126, 128 each connected by a screw 30 to a brush assembly 134.

The end caps 126, 128 have blind cylindrical chew cavities 36 recessed within an upper portion 138. Each chew cavity 136 is terminated by an end wall 40 formed by an upper portion 138. Each end cap 126, 128 has a mounting wall 142 positioned below and extending downwardly from the upper portion 138 which is configured as an end wall 144 within a blind cylindrical lower cavity 145 which defines a recess positioned below the upper portion.

The brush assembly 134 has a cylindrical plastic brush support member 148 which has a regular pattern of holes 150 which each receive a tuft 152 comprised of multiple flexible plastic bristles 154 which together define an array 151 of bristles which protrude generally radially from the support member and extend upwardly towards the elongated chew member 24 when it is engaged between the chew cavities 136. The tufts 152 are positioned on the upper half of the brush member for engagement by a dog's teeth. The brush support member 148 has mounting segments 160 of the brush member which are free of bristles. Each mounting segment 160 is received within a recess 145 of the first end cap 126 and the second end cap 128. As shown in FIG. 7, each end cap 26, 28 has a protruding nubbin 162 which protrudes from the end wall 140 within the chew cavity 136 towards the brush support member 148. The nubbins 162 are disposed above the axis of the brush support member 148 and extend into axially extending anti-rotation holes 163 formed on the end surfaces 158 of the brush support member and also located off-axis of the brush support member. The engagement of the nubbins 162 within the anti-rotation holes 163 in the brush support member restricts rotation of the brush assembly with respect to end caps, maintaining the bristles 54 directed towards the dog's teeth when it is chewing on the elongated chew member.

The brush assembly 134 brush support member 148 is fastened between the first end cap 126 and the second end cap 128 by the screws 130. Each screw 130 extends through a non-threaded hole 164 passing through an end cap end wall 144 and into a threaded pilot hole 168 in the brush support member 148 which opens on the end surface 158.

The spacing of the dog toothbrush from the elongated chew element is selected such that when a dog chews on the chew element, the toothbrush is positioned to engage the dog's teeth and gums to affect a beneficial cleaning and stimulation of the teeth and gums. It is to be understood that the spacing of the dog toothbrush from the dog chew element may be varied depending on the size and possibly the breed of the dog which can be specified by the weight of the dog for which the dog toothbrush with attached treat is intended.

It is understood that the invention is not limited to the particular construction and arrangement of parts herein illustrated and described, but embraces all such modified forms thereof as come within the scope of the following claims.

I claim:

1. A dog toothbrush comprising:
   a first end cap having a first chew cavity positioned above a first mounting wall, the first chew cavity being terminated by a first end wall;
   a second end cap having a second chew cavity positioned above a second mounting wall, the second chew cavity facing the first chew cavity and being terminated by a second end wall;
   a brush assembly having a brush support member from which a plurality of bristles protrude, the brush support member being fastened between the first end cap and the second end cap such that the brush support member engages the first mounting wall and the second mounting wall such that the plurality of bristles extend upwardly; and
   at least one fastener connecting the first end cap to the brush support member, the fastener being releasable to permit the first end cap to be selectively removed from the brush support member, such that an elongated chew element is insertable into the first chew cavity and the second chew cavity and supportable between the first end cap and the second end cap, and restricted in its axial travel by the first end wall and the second end wall when the first end cap is secured to the brush support member.

2. The dog toothbrush of claim 1 wherein the first end cap has an upper portion and the first chew cavity is recessed within the upper portion, and wherein the first mounting wall comprises a flange which extends downwardly from the upper portion, and wherein the brush support member has an end surface extending substantially parallel to the flange and engaged against the flange.

3. The dog toothbrush of claim 2 wherein the first end cap upper portion has a recess positioned below the upper portion adjacent the flange, and wherein the brush support member has an upper surface extending from the end surface, the upper surface having portions which are received within the recess, and rotation of the first end cap with respect to the brush support member is restricted by engagement of the upper surface with the first end cap upper portion within the recess.

4. The dog toothbrush of claim 2 wherein the at least one fastener comprises a screw which extends through a screw hole in the flange into an opening in the brush support member.

5. The dog toothbrush of claim 1 further comprising a second fastener which is removably mounted to connect the second end cap to the brush support member.

6. The dog toothbrush of claim 1 wherein the first chew cavity and the second chew cavity extend downwardly to a first height from the brush support member, and wherein the plurality of bristles extend upwardly from the brush support member a distance greater than the first height, such that an elongated chew member engaged between the first chew cavity and the second chew cavity is engaged with the plurality of bristles.

7. The dog toothbrush of claim 1 wherein the brush support member has portions defining a cylinder and wherein the plurality of bristles protrude radially from the brush support member.

8. The dog toothbrush of claim 1 wherein the brush support member has portions which engage with portions of the end caps to restrict rotation of the brush support member with respect to the end caps.

9. A dog toothbrush assembly comprising:
   an elongated chew element extending between a first chew end and a second chew end, the elongated chew element being of a diameter small enough to be received within a dog's mouth;
   a first end cap having a first chew cavity positioned above a first mounting wall, the first chew cavity being terminated by a first end wall;
   a second end cap having a second chew cavity positioned above a second mounting wall, the second chew cavity facing the first chew cavity and being terminated by a second end wall;
   a brush assembly having a brush support member and a plurality of bristles extending upwardly from the brush support member, the brush support member being fastened between the first end cap and the second end cap; and
   a fastener extending from the first end cap to engage the brush support member and adjustable to allow the separation of the first end cap from the brush support member, wherein the first chew end of the elongated chew element is received within the first chew cavity and the second chew end of the elongated chew element is received within the second chew cavity such that the elongated chew element is supported between the first end cap and the second end cap when the first end cap is secured to the brush support member, the elongated chew element thereby being mounted in proximity to the plurality of bristles such that a dog having teeth, when chewing on the elongated chew element, exposes the teeth to the bristles for brushing thereof.

10. The dog toothbrush assembly of claim 9 wherein the first end cap has an upper portion and the first chew cavity is recessed within the upper portion, and wherein the first mounting wall comprises a flange which extends downwardly from the upper portion, and wherein the brush support member has an end surface extending substantially parallel to the flange and engaged therewith.

11. The dog toothbrush assembly of claim 10 further comprising a second fastener which extends through the second end cap to removably mount the second end cap to the brush support member.

12. The dog toothbrush assembly of claim 10 wherein the first chew cavity and the second chew cavity extend downwardly to a first height from the brush support member, and wherein the plurality of bristles extend upwardly from the brush support member a distance greater than the first height, such that the plurality of bristles engage and are deflected by their engagement with the elongated chew element.

13. The dog toothbrush assembly of claim 10 wherein the brush support member has portions defining a cylinder and wherein the plurality of bristles protrude radially from the brush support member.

14. The dog toothbrush assembly of claim 10 wherein the brush support member has portions which engage with portions of the end caps to restrict rotation of the brush support member with respect to the end caps.

15. The dog toothbrush assembly of claim 10 wherein the first end cap upper portion has a recess positioned below the upper portion adjacent the flange, and wherein the brush support member has an upper surface extending from the end surface, the upper surface having portions which are received within the recess, and rotation of the first end cap with respect to the brush support member is restricted by engagement of the upper surface with the first end cap upper portion within the recess.

16. The dog toothbrush assembly of claim 10 wherein the fastener comprises a screw which extends through a screw hole in the flange into an opening in the brush support member.

17. A dog toothbrush assembly comprising:
 a first end cap;
 a second end cap positioned opposite the first end cap;
 an elongated chew element having an edible component extending between the first end cap and the second end cap and engaged and retained thereto;
 a first end wall extending beneath the first end cap;
 a second end wall extending beneath the second end cap; and
 a brush assembly having a brush support member fixed to the first end wall and the second end wall and spaced beneath the elongated chew element, the brush assembly having a plurality of bristles which extend outwardly from the brush support member towards the elongated chew element, wherein the first end cap first end wall is releasably connected to the brush support member to permit the first end cap to be selectively removed from the brush support member for insertion of the elongated chew element between the first end cap and the second end cap, the elongated chew element thereby being mounted in proximity to the plurality of bristles such that a dog having teeth, when chewing on the elongated chew element, exposes the teeth to the plurality of bristles for brushing thereof.

18. The dog toothbrush assembly of claim 17 wherein the brush support member has portions which engage with portions of the end caps to restrict rotation of the brush support member with respect to the end caps.

19. The dog toothbrush assembly of claim 17 wherein the brush support member has portions defining a cylinder and wherein the plurality of bristles protrude radially from the brush support member, and wherein the brush support member has portions which engage with portions of the end caps to restrict rotation of the brush support member with respect to the end caps.

20. A dog toothbrush assembly comprising:
 a first end cap;
 a second end cap positioned opposite the first end cap;
 an elongated chew element having an edible component extending between the first end cap and the second end cap and engaged and retained thereto; and
 a brush assembly fixed between the first end cap and the second end cap, and having a brush support member spaced beneath the elongated chew element and having a plurality of bristles which extend towards the elongated chew element, wherein the first end cap is releasably connected to the brush support member to permit the first end cap to be selectively removed from the brush support member for insertion of the elongated chew element between the first end cap and the second end cap;
 wherein the brush support member has portions which engage with portions of the end caps to restrict rotation of the brush support member with respect to the end caps; and wherein the brush support member portions comprise axially extending holes opening on end surfaces of the brush support member, and the end caps have nubbins which are received within the axially extending holes.

\* \* \* \* \*